United States Patent
Chen et al.

(10) Patent No.: US 10,936,459 B2
(45) Date of Patent: Mar. 2, 2021

(54) FLEXIBLE MICROCONTROLLER SUPPORT FOR DEVICE TESTING AND MANUFACTURING

(71) Applicant: Microsoft Technology Licensing, LLC, Redmond, WA (US)

(72) Inventors: Nicholas Yen-Cherng Chen, Cambridge (GB); Stephen E. Hodges, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/213,004

(22) Filed: Dec. 7, 2018

(65) Prior Publication Data

US 2020/0183804 A1  Jun. 11, 2020

(51) Int. Cl.
| | |
|---|---|
| *G06F 11/27* | (2006.01) |
| *G06F 30/30* | (2020.01) |
| *G06F 21/85* | (2013.01) |
| *G06F 21/62* | (2013.01) |
| *G06F 21/79* | (2013.01) |
| *G06F 21/74* | (2013.01) |

(52) U.S. Cl.
CPC .............. *G06F 11/27* (2013.01); *G06F 21/74* (2013.01); *G06F 21/85* (2013.01); *G06F 30/30* (2020.01); *G06F 21/629* (2013.01); *G06F 21/79* (2013.01)

(58) Field of Classification Search
CPC .......... G06F 11/27; G06F 30/30; G06F 21/85; G06F 17/50–5081; G06F 21/629; G06F 21/79; G06F 21/74
See application file for complete search history.

(56) References Cited

U.S. PATENT DOCUMENTS

| | | | |
|---|---|---|---|
| 5,455,937 A | 10/1995 | Berman et al. | |
| 5,469,557 A | 11/1995 | Salt et al. | |
| 8,429,471 B2 | 4/2013 | Henry et al. | |
| 9,465,432 B2 | 10/2016 | Henry et al. | |
| 10,222,417 B1* | 3/2019 | Garg | G01R 31/31725 |
| 2003/0200425 A1* | 10/2003 | Swoboda | G06F 9/3005 712/229 |
| 2004/0246781 A1 | 12/2004 | Liu | |
| 2007/0174910 A1* | 7/2007 | Zachman | G06F 21/79 726/18 |

(Continued)

FOREIGN PATENT DOCUMENTS

WO    9310501 A1    5/1993

OTHER PUBLICATIONS

"Purism", Retrieved From: https://web.archive.org/web/20170904124536/https:/puri.sm/learn/intel-me/, Sep. 4, 2017, 4 Pages.

*Primary Examiner* — Stacy Whitmore
(74) *Attorney, Agent, or Firm* — Davin Chin; Chin IP, PLLC

(57) ABSTRACT

The disclosed technology is generally directed to microcontrollers. In one example of the technology, an operating system is run on at least one processor of a multi-core controller. At the operating system, a command that is associated with a manufacturer test mode is received. A permission associated with the command is requested. The permission is based, at least in part, on the status of a one-way e-fuse. Responsive to the permission associated with the command being granted, the command is caused to be processed.

20 Claims, 5 Drawing Sheets

(56) References Cited

U.S. PATENT DOCUMENTS

| | | | |
|---|---|---|---|
| 2007/0258309 A1* | 11/2007 | Dixon | G11C 7/24 365/225.7 |
| 2009/0063916 A1* | 3/2009 | Vogelsang | G11C 29/4401 714/719 |
| 2009/0076747 A1* | 3/2009 | Lee | G01R 31/2844 702/58 |
| 2009/0318134 A1* | 12/2009 | Chao | G06F 9/441 455/425 |
| 2010/0333055 A1* | 12/2010 | Yu | G06F 11/267 716/108 |
| 2011/0248734 A1* | 10/2011 | Takeda | G01R 31/2867 324/750.03 |
| 2012/0192282 A1* | 7/2012 | Suyama | G06F 12/1433 726/26 |
| 2013/0297948 A1* | 11/2013 | Lee | G06F 21/602 713/193 |
| 2014/0157055 A1* | 6/2014 | Mozak | G06F 11/263 714/33 |
| 2014/0331209 A1* | 11/2014 | Singh | G06F 11/3688 717/127 |
| 2015/0235053 A1* | 8/2015 | Lee | G06F 21/602 713/193 |
| 2015/0247739 A1* | 9/2015 | Dutta | G01C 17/28 702/92 |
| 2017/0052799 A1* | 2/2017 | Steedman | G06F 13/4022 |
| 2018/0226136 A1* | 8/2018 | Jeansonne | G11C 29/44 |
| 2019/0242941 A1* | 8/2019 | Wu | G01R 31/2886 |
| 2019/0272176 A1* | 9/2019 | Raghuram | G06F 1/24 |

* cited by examiner

FLEXIBLE MICROCONTROLLER SUPPORT FOR DEVICE TESTING AND MANUFACTURING

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to microcontrollers. In one example of the technology, an operating system is run on at least one processor of a multi-core controller. In some examples, at the operating system, a command that is associated with a manufacturer test mode is received. In some examples, a permission associated with the command is requested. In some examples, the permission is based, at least in part, on the status of a one-way e-fuse. In some examples, responsive to the permission associated with the command being granted, the command is caused to be processed.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
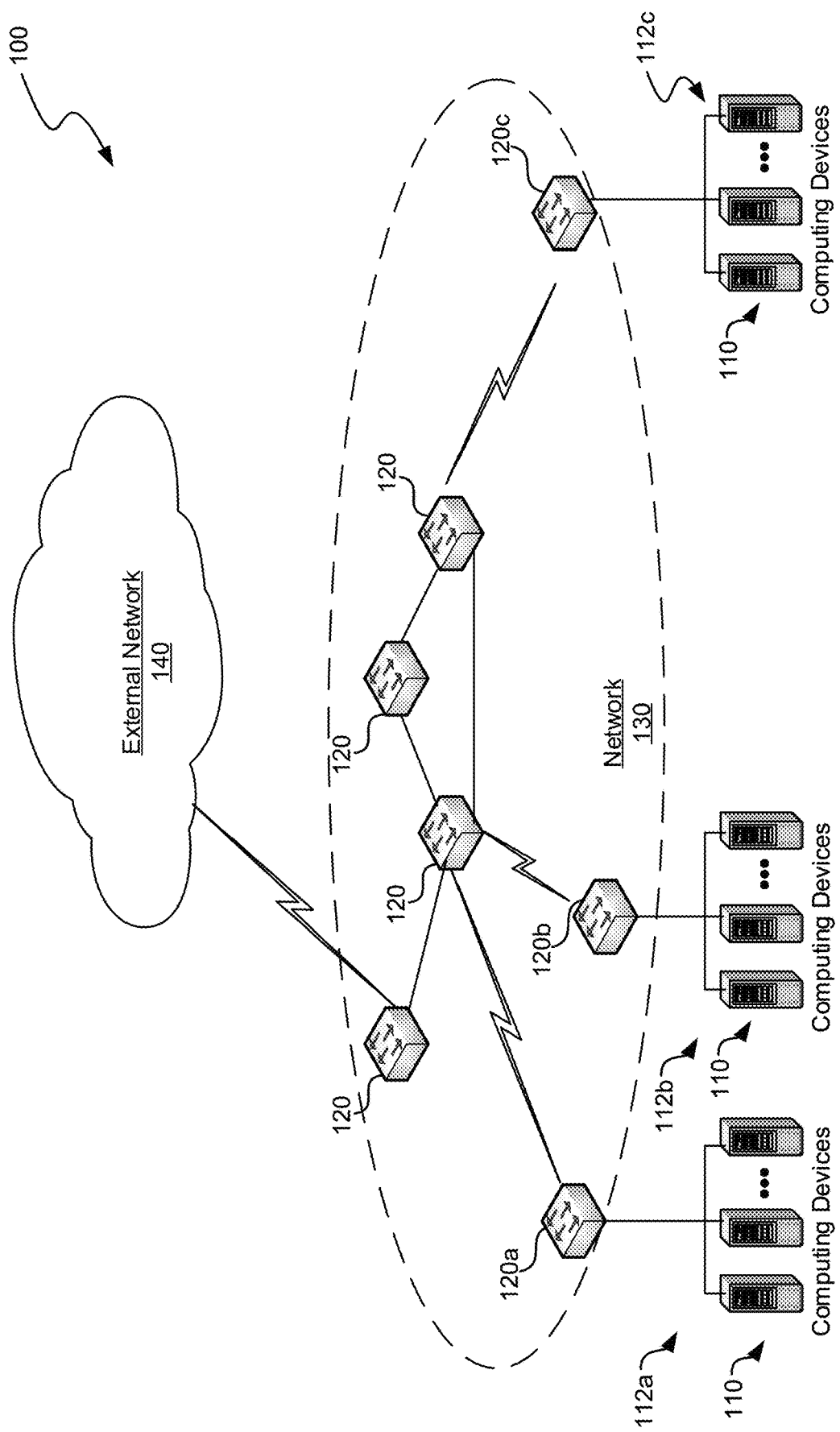
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to microcontrollers. In one example of the technology, an operating system is run on at least one processor of a multi-core controller. In some examples, at the operating system, a command that is associated with a manufacturer test mode is received. In some examples, a permission associated with the command is requested. In some examples, the permission is based, at least in part, on the status of a one-way e-fuse. In some examples, responsive to the permission associated with the command being granted, the command is caused to be processed.

In some examples, a device includes a multi-core microcontroller is capable of operating in a manufacturer test mode. The manufacturer test mode may allow operations that should only occur in a test environment, such as taking the radio out of compliance, and/or the like.

The multi-core microcontroller may run an operating system that controls access to the manufacturer test mode. In order to access the test mode, the manufacturer may install a relay in the device that allows communication between a testing host and the operating system. In some examples, responsive to the testing host wishing the device to operate in manufacturer test mode, and the operating system receiving a corresponding command relayed by the relay from the testing host, the operating system verifies whether the manufacturer test mode is allowed. The verification may be determined in part by checking the status of an e-fuse. In some examples, the e-fuse in contained in a separate security subsystem, which the operating system queries.

In some examples, the security sub-system determines whether the manufacturing test mode is allowed based on the status of the e-fuse. If the e-fuse has not been blown, then in some examples, the manufacturer test mode is allowed. In some examples, under normal circumstances, if the e-fuse has been blown, the manufacturer test mode is not allowed. There may be exceptions, such as a certificate that allows the manufacturer test mode even though the e-fuse has been blown.

After testing is complete, in some examples, the operating system communicates this to the security sub-system, which then blows the e-fuse, and the relay is uninstalled. In this way, in some examples, the manufacturer test mode cannot be accessed by the end user.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT hub, a device comprising part or all of an application back-end, or the like, as discussed in greater detail below.

Illustrative Computing Device

Figure 2:
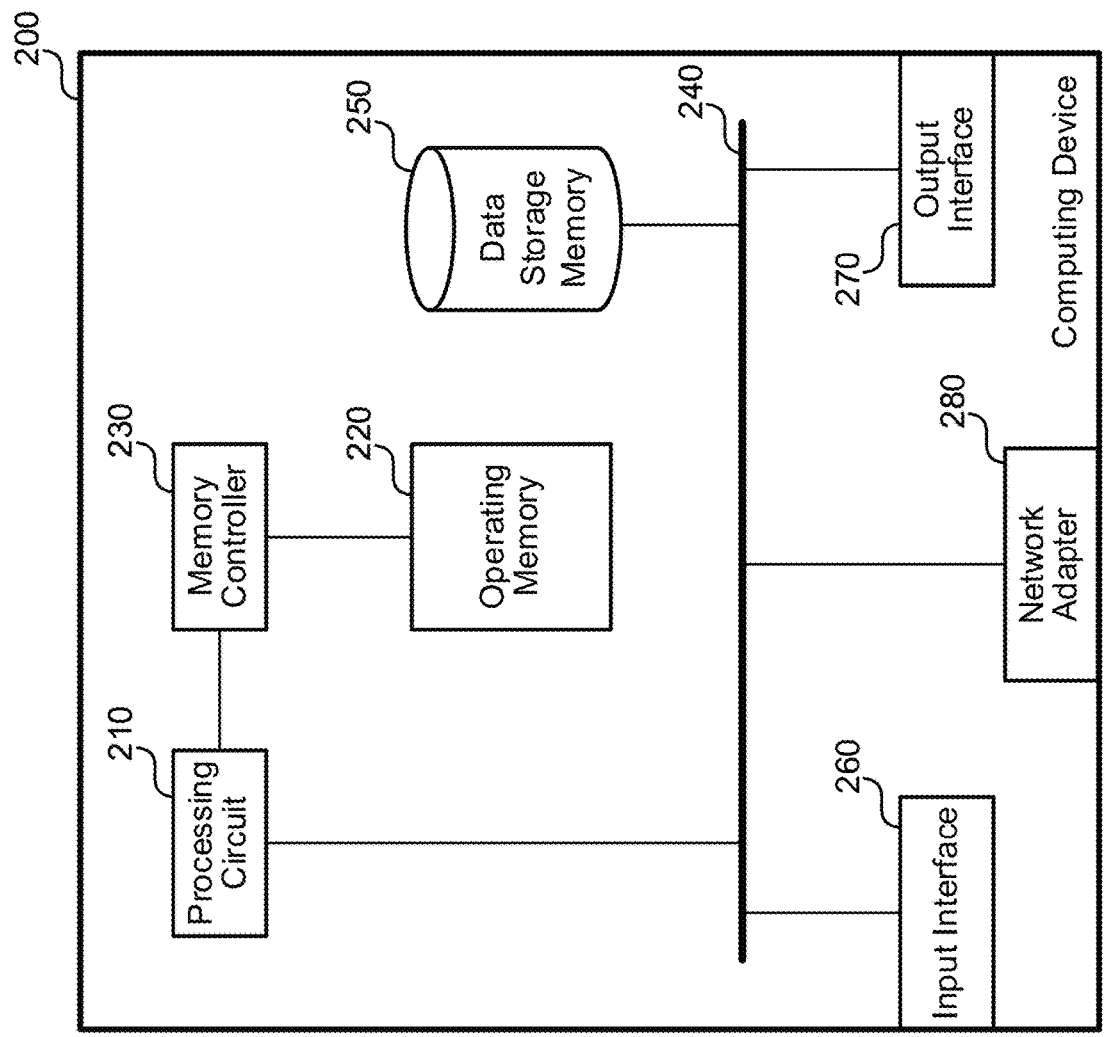
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-4, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as a single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
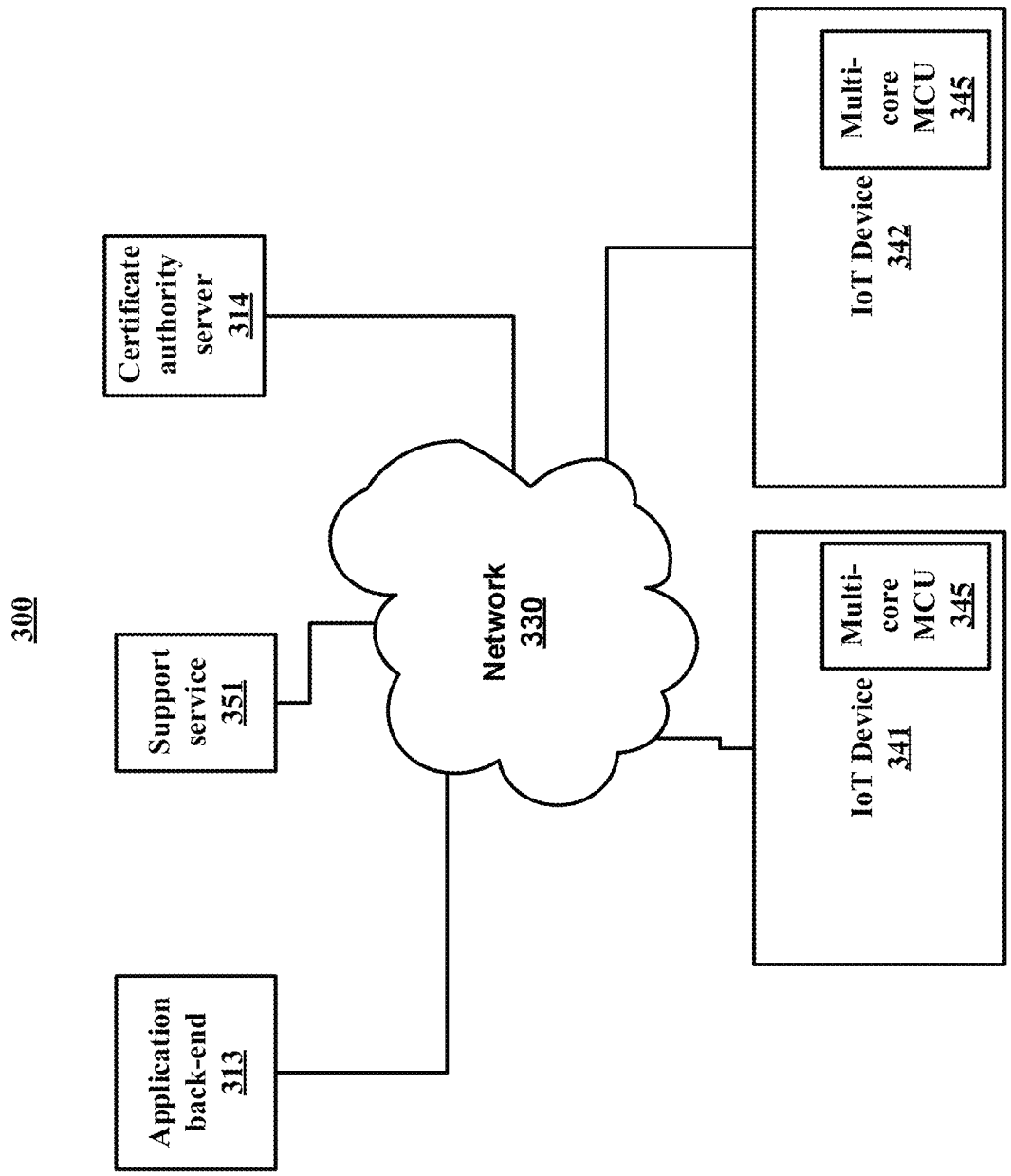
FIG. 3 is a block diagram illustrating an example of a system.

FIG. 3 is a block diagram illustrating an example of a system (300). System 300 may include network 330, as well as support service 351, IoT devices 341 and 342, application back-end 313, and certificate authority server 314, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, and numerous other applications.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. In other examples, system 300 is used for functions other than IoT, in which application back-end 313 may perform other suitable corresponding functions. In some examples, at least some of the actions taken by the application back-end may be performed by applications running in application back-end 313.

In some examples, support service 351 includes a security service for multi-core microcontrollers (MCUs) 345. In some examples, support service 351 also includes an IoT support service. The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

Each of the IoT devices 341 and 342, and/or the devices that comprise support service 351 and/or application back-end 313 may include examples of computing device 200 of FIG. 2. In some examples, support service 351 includes an IoT support service. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. In some examples, the IoT support service is in the cloud, whereas the IoT devices are edge devices. FIG. 3 and the corresponding description of FIG. 3 in the specification illustrates an example system for illustrative purposes that does not limit the scope of the disclosure.

In some examples, one or more of the IoT devices 341 and 342 includes multi-core microcontroller 345. Each multi-core microcontroller 345 may be an integrated circuit that includes a set of independent execution environments including at least two independent execution environments. At least two of the independent execution environments may be general purpose cores with differing capabilities. The independent execution environments in the set of independent execution environments may be configured in a defense-in-depth hierarchy.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between support service 351, IoT devices 341 and 342, application back-end 313, and certificate authority server 314. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by the IoT support service, which, in some examples, includes one or more IoT support services that are included in support service 351. Application back-end 313 may include a device or multiple devices that perform actions in providing a device portal to users of IoT devices.

In other examples, devices 341 and 342 are not IoT devices, but are instead other suitable devices that include a multi-core microcontroller 345.

Multi-core microcontroller 345 may be capable of operating in a manufacturer test mode responsive to being properly enabled. In some examples, while multi-core microcontroller 345 is operating in manufacturer test mode, multi-core microcontroller 345 is capable of performing actions that should only be performed in a test environment, and which should not be accessible by an end user of the device.

For example, multi-core microcontroller 345 may include a radio that is capable of operating in a manner that should only performed in a shielded test environment, operating out of compliance, such as being operated at frequencies that are not legal while operated by end users, or may be operated at power levels or with patterns that could be highly disruptive outside of a shielded test environment.

As another example, multi-core microcontroller 345 may have pins and/or operations that should only be accessible and/or operational in a test environment. For example, a pin may cause automatic shutdown of the device, which may be useful in a test environment, whereas the pin should not be accessible in normal operation, because a shutdown command should be processed by the operating system, which may need to perform a write operation before shutting down. The pin may therefore by operational and accessible only during the manufacturing test mode, and not outside of it.

Multi-core microcontroller 345 may run an operating system that controls access to the manufacturer test mode. In order to access the test mode, the manufacturer may install a relay in the device that allows communication between a testing host and the operating system. Responsive to the testing host wishing the device to operate in test mode, and the operating system receiving a corresponding command relayed by the relay from the testing host, in some examples, the operating system verifies whether the test mode is allowed. The verification may be determined in part by checking the status of an e-fuse. In some examples, the e-fuse is contained in a separate security subsystem, which the operating system queries.

In some examples, the security sub-system determines whether the manufacturing test mode is allowed based on the status of the e-fuse. In some examples, if the e-fuse has not been blown, the manufacturer test mode is allowed. In some examples, under normal circumstances, if the e-fuse has been blown, the manufacturer test mode is not allowed.

There may be exceptions, such as a certificate that allows the manufacturer test mode even though the e-fuse has been blown.

In some examples, after testing is complete, the operating system communicates this to the security sub-system, which then blows the e-fuse, and the relay is uninstalled. In this way, in these examples, the manufacturer test mode cannot be accessed by the end user.

There may be a need to access the manufacturer test mode again after the e-fuse has been blown, such as after a faulty device has been returned to the manufacturer. In some examples, accessing the manufacturer test mode can be accomplished via a certificate that can be granted by certificate authority server 314. In some examples, certificate authority server 314 is arranged to control access to certificates for enabling access to the manufacturer test mode.

System 300 may include more or less devices than illustrated in FIG. 3, which is shown by way of example only.

Figure 4:
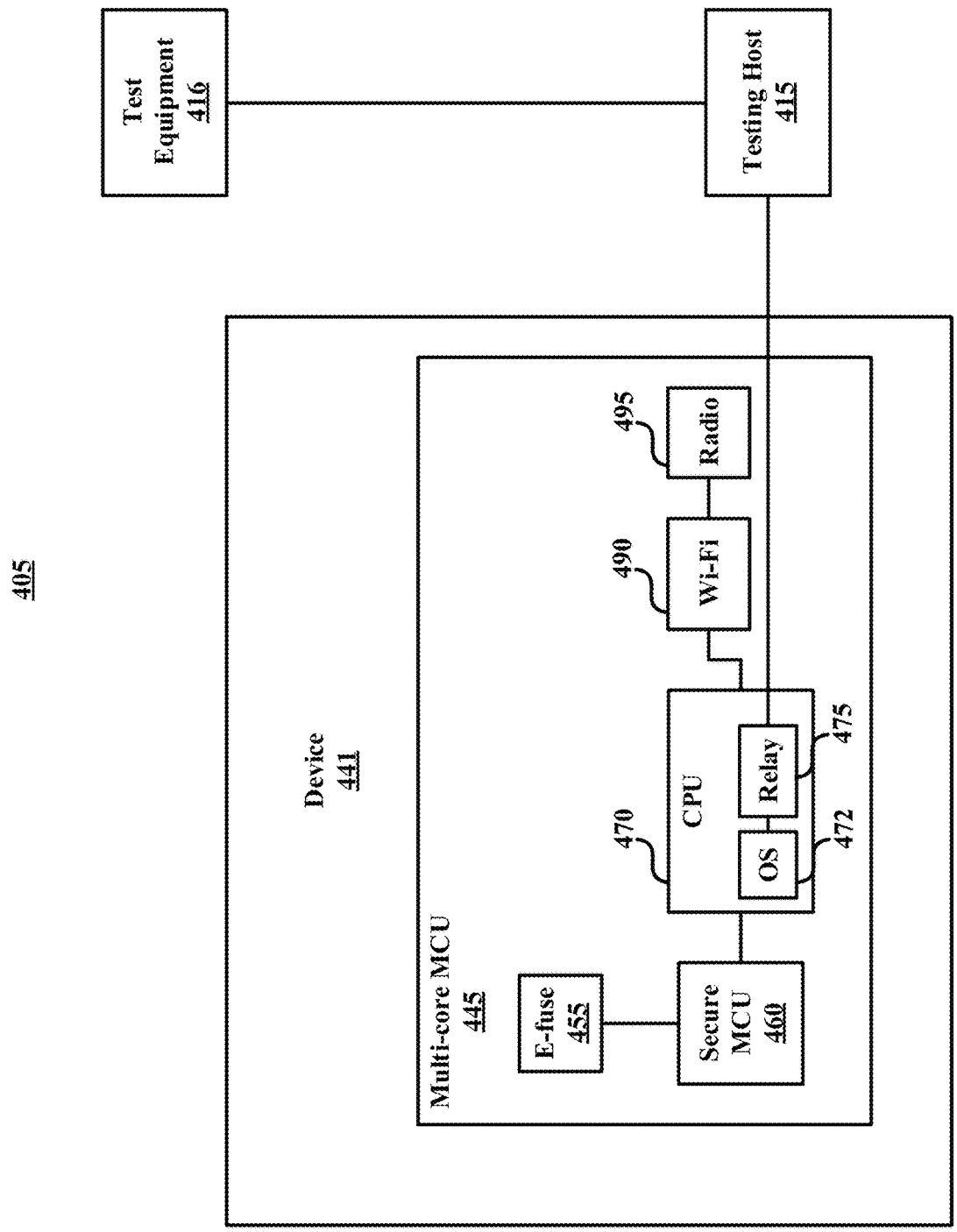
FIG. 4 is a block diagram illustrating an example of another system.

FIG. 4 is a block diagram illustrating a system (405). System 405 may include device 441, testing host 415, and test equipment 416. Device 441 may be an example of device 341 or 342 of FIG. 3. Device 441 may include multi-core microcontroller 445. Multi-core microcontroller 445 may include secure microcontroller (MCU) 460, central processing unit (CPU) 470, Wi-Fi core 490, e-fuse 455, and radio 495. In some examples, secure MCU 460 and E-fuse 455 may be included on a different integrated circuit than CPU 470.

In some examples, multi-core microcontroller 445 enables device 441 in which device 441 is included to operate as an IoT device. In other examples, multi-core microcontroller 445 may enable device 441 to operate as some other suitable type of device other than an IoT device. In some examples, multi-core microcontroller 445 may have at least 4 MB of RAM and at least 4 MB of flash memory. In some examples, multi-core microcontroller 445 provides not just network connectivity, but various other functions including hardware and software security, a monitored operating system, cryptographic functions, peripheral control, telemetry, and/or the like. In addition, multi-core microcontroller 445 may include technology for allowing the device to be booted in a secure manner, allowing the device to be securely updated, ensuring that proper software is running on the device, allowing the device to function correctly as an IoT device or other suitable type of device, and/or the like.

In some examples, multi-core microcontroller 445 is an integrated circuit that may include multiple independent execution environment that include two different general-purpose cores with different capabilities. For example, the multiple cores may include at least a microcontroller and a CPU. In some examples, the independent execution environments are configured to have a defense-in-depth hierarchy.

In some examples, not only are independent execution environments managed by a software component from a more trusted execution environment, but different functions are assigned to the different independent execution environments, with more sensitive functions assigned to more trusted independent execution environments. In one particular example, independent execution environments less trusted than the independent execution environment to which it is assigned are restricted from having access to the function. In this way, the independent execution environments may achieve defense-in-depth based on a hierarchy of trust. In other examples, other suitable means of security may be employed.

In some examples, each level of the hierarchy of trust except for the bottom (i.e., least trusted) level of the hierarchy has complete control to accept or reject any requests from a less trusted level, e.g., in terms of implementing support for the software they handle, and have the ability to rate limit or audit the requests from less trusted levels and to validate requests from lower levels to ensure that the requests correct and true. Also, in some examples, each level of hierarchy except the top (i.e., most trusted) level has a parent that is responsible for managing the lower (i.e., less trusted) level, including monitoring the software of the lower level and ensuring that the software on the lower level is running correctly.

Additionally, in some examples, apart from the highest layer of the hierarchy, no layer of the hierarchy starts without a higher level of the hierarchy having validated the layer and, after validating the layer, allowed the layer to start. Also, in these examples, a layer of the hierarchy has the ability to stop any lower level of hierarchy, for example, at any time. Accordingly, in these examples, multi-core microcontroller 445 has the software capability of each layer of the hierarchy having complete dominance over lower (i.e., less trusted) levels of the hierarchy in terms of stopping and starting and running of the lower levels of the hierarchy.

In some examples, Wi-Fi core 490 is a microcontroller or a CPU that may provide Wi-Fi functionality and connectivity to the Internet and cloud services such as IoT services. In some examples, core 490 may provide Wi-Fi functionality via radio 495. In some examples, core 490 may provide communications via Bluetooth and/or other connectivity technology.

A testing phase may occur for device 441 while the device is still with the manufacturer. During testing, device 441 may be connected to testing host 415. In some examples, testing host 415 is a PC external to device 441 that is connected to test equipment 416. Testing host 415 may be connected to device 441 via a serial cable, network communication, or via other suitable means. The testing may include, among other things, testing of radio 495 in device 441.

In some examples, it may be desired to place device 441 in a manufacturer test mode, in order to perform tests for radio 495, and/or for other kinds of tests. In some examples, accessing the manufacturer test mode can only be accomplished via communication with OS 472 running on CPU 470. However, in some examples, the OS has no in-built capabilities for communicating with testing host 415. In some examples, testing host 415 obtain relay software from the support service (e.g., support service 351 of FIG. 3.) Testing host 415 may cause a relay (475) to be installed in CPU 470. In some examples, relay 475 is software that relays communication between testing host 415 and OS 472. Relay 475 may be configured to listen on multi-core microcontroller 445 for commands to trigger on multi-core microcontroller 445 itself and relaying any such command to OS 472.

In some examples, if OS 472 receives a command that requires the manufacturer test mode, and micro-controller 475 is not already in the manufacturer test mode, then a verification must be made that manufacturer test mode is allowed before the manufacturer test mode can be entered. In some examples, OS 472 communicates a message to a security subsystem to query whether manufacturer test mode is allowed. In some examples, the security subsystem is secure MCU 460. In some examples, responsive to receiving the query, secure MCU 460 checks the status of e-fuse 455.

In some examples, e-fuse 455 is a one-way fuse with a one-time programmable bit. In some examples, once e-fuse 455 is blown, the status of e-fuse 455 cannot be reversed. An e-fuse may also be referred to as a one-time programmable bit, and may also be an antifuse or the like. In some examples, an e-fuse is in essence a one-time programmable read-only memory with a single bit—once the bit has been programmed, it cannot be unprogrammed. This may be accomplished by blowing a fuse, where a fuse starts with low resistance and is designed to permanently break a conductive path, for example responsive to the current through the path reaching a particular threshold, or an antifuse, which starts with a high resistance and creates a permanent conductive path responsive to the voltage across the antifuse reaching a particular threshold. In either case, programming the bit, which is irreversible, is referred to as the e-fuse being "blown."

In some examples, if e-fuse 455 has not been blown, then the manufacturer test mode is allowed. In some examples, the status of e-fuse 455 is not the exclusive criteria for determining whether manufacturer test mode is allowed. For instance, in some examples, as discussed in greater detail below, a valid certificate may allow the manufacturer test mode even after e-fuse 455 is blown. Also, in some examples, the permission determination is made based on a combination of fuses being blown, rather than being based upon a single fuse. In some examples, secure MCU 460 is on a different integrated circuit than CPU 470.

In some examples, secure MCU 460 determines whether manufacturer test mode is allowed, and transmits the information to OS 472 in response to the request. In some examples, if the manufacturer test mode is not allowed, then OS 472 does not enter manufacturer test mode. In some examples, if instead OS 472 receives an indication from secure MCU 460 that the manufacturer test mode is allowed, then OS 472 causes the manufacturer test mode to begin. In some examples, as previously discussed, e-fuse 455 is under the purview of secure MCU 460, and the determination of permission for the manufacturer test mode is made by secure MCU 460. In other examples, e-fuse 455 is under the purview of OS 472, and OS 472 makes the determination of permission. In some examples, once the device is permitted to operate in manufacturer test mode, all commands that require the manufacturer test mode can then operate until the manufacturer test mode ends. In other examples, each time a command that requires manufacturer test mode is received by OS 472, a determination of permission is made again.

The manufacturer test mode may enable functions that are not normally allowed. Among other things, testing of radio 495 may occur during the manufacturer test mode, including use of frequencies, power levels, and patterns for the radio that are not normally permitted, for testing and calibration of the radio. In some examples, for these radio commands, while device is in the manufacturer test mode as enabled by OS 472, commands are received by OS 472 (via relay 475), which then control Wi-Fi core 490 to process the command, and Wi-Fi core 490 in turns processes the command via control of radio 495. Test equipment 416 may assist in the calibration and testing of radio 495, such as measurement of the power output by radio 495. The manufacturer test mode may also enable other suitable functions, such as access to various pins and/or functions not normally accessible, other suitable low-level functions, and/or the like. In some examples, all functions that require the manufacturer test mode are accessible only through OS 472.

In some examples, after all of the tests are completed, testing host 415 sends a message that testing is complete, which is relayed by relay 475 to OS 472. OS 472 then sends an indication that testing is complete to secure MCU 460, and secure MCU 460 in turn causes e-fuse 455 to be blown. Relay 475 is then uninstalled in some examples.

In some examples, if a user that should not have access to the manufacturer test mode wished to improperly enter manufacturer test mode, the user would be unable to even attempt to cause a command to enter manufacturer test mode without the relay software. In some examples, even if the user were somehow able to obtain the relay software and install the relay software, the user would not be able to cause the device to enter the manufacturer test mode, because the OS would query the security subsystem, the security subsystem would see that the e-fuse is blown, and access to the manufacturer test mode would be denied.

In some examples, there may be various means to ensure that the manufacturer test mode is not somehow left enabled by having the device leave the factory of the manufacturer with the e-fuse not blown. In some examples, device 441 includes means for the e-fuse to be blown based on a remote command from either the manufacturer or the service. In some examples, OS 472 periodically performs a self-check to report back the status of various factors from secure MCU 460, including whether multi-core microcontroller 445 can enter manufacturer test mode, and externally reports the self-check report (e.g., over a network via Wi-Fi via radio 495). In some examples, responsive to an indication that the device can enter manufacturer test mode, this information will be indicated on a monitoring interface accessible by the manufacturer or the service, which can then send a remote command to blow the e-fuse.

In some examples, the device has only partial functionality (e.g., reduced functionality is enforced by OS 472) until e-fuse 455 is blown. In some examples, if e-fuse 455 is not blown, access to certain network locations is selectively blocked, and/or device functionality if selectively disabled. For instance, in some examples, device 441 can connect over a network only to receive software updates and the like, but cannot connect to other network locations. This may create an incentive for ensuring that e-fuse 455 is blown after testing is complete.

In some examples, a device may return to the manufacturer with a need to place the device into the manufacturer test mode again even though the e-fuse has already been blown. For example, a device may be returned to the manufacturer because the device is faulty. In this case, is may be possible to obtain a certificate that enables the manufacturer test mode for the device even after the e-fuse has been blown.

In some examples, each secure MCU 460 of each device 441 has a unique ID along with a unique cryptographic key, which are both generated the first time that device 441 is powered on.

Returning to FIG. 3, a manufacturer may register the device ID of the security subsystem in device 341 with certificate authority server 314. Certificate authority server 314 may correspondingly store an association between the unique ID for device 341 and the manufacturer. The manufacturer may subsequently request a per-device certificate in order to be allowed to operate in the manufacturer test mode even though e-fuse in multi-core microcontroller 345 has been blown. The manufacturer may communicate with certificate authority server 314, with the manufacturer authenticating itself as a valid manufacturer to certificate authority server 314. Responsive to authentication, certificate authority server 314 can generate a certificate that is assigned to and valid for a particular device where the unique ID corresponds uniquely to a device that has been associated with the authenticated manufacturer. Certificate authority server 314 can then send the certificate to the authenticated manufacturer. In some examples, the certificate is only valid for the particular device containing the unique security subsystem ID for the particular device.

Returning to FIG. 4, testing host 415 may be connected to device 441 again, and relay 475 installed again in CPU 470. As before, relay 475 may be configured to listen on multi-core microcontroller 445 for commands to trigger on multi-core microcontroller 445 itself and relaying any such command to OS 472.

In some examples, if OS 472 receives a command that requires the manufacturer test mode, and micro-controller 475 is not already in the manufacturer test mode, then a verification must be made that the manufacturer test mode is allowed before the manufacturer test mode can be entered. Testing host 415 may also transmit the certificate to OS 472 via relay 475. In some examples, OS 472 communicates a message to secure MCU 460 to query whether manufacturer test mode is allowed, sending the certificate along with the query. Secure MCU 460 may then determine whether either e-fuse 455 is not blown or whether there is a valid certificate granting permission to enter manufacturer test mode. In some examples, the certificate is transmitted to OS 472 rather than to relay 475. In some examples, the certificate is transmitted directly to secure MCU 460.

In some examples, if either e-fuse 455 is not blown or there is a valid certificate granting permission to enter manufacturer test mode, secure MCU 460 grants permission to enter manufacturer test mode. In some examples, if e-fuse 455 is blown and there is no valid certificate, permission is denied. Validation of the certificate may involve the certificate, the unique ID of secure MCU 460, and the unique cryptographic key for secure MCU 460. In some examples, security subsystem 455 then sends the results of the query back to OS 472. In some examples, if permission was granted, OS 472 enters manufacturer test mode.

In some examples, once the manufacturer test mode is complete, the certificate is invalidated so that it may not be used again. In some examples, the certificate may have a time limit by which it expires. In some examples, after expiration in either event or for another suitable reason, entering test mode again would require a new certificate for the device to be issued by the certificate authority server.

In some examples, although not shown in FIG. 4, secure MCU 460 may be in the path between OS 472 and radio 495. In this way, in these examples, secure MCU 460 can directly control whether instructions can pass to radio 495. In some of these examples, if a determination is made that manufacturer test mode is allowed, secure MCU 460 passes through corresponding instructions to radio 495 unchanged. In some of these examples, if a determination is made that manufacturer test mode is allowed, special instructions on secure MCU 460 are invoked that in turn issue instructions to radio 495.

Illustrative Process

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5:
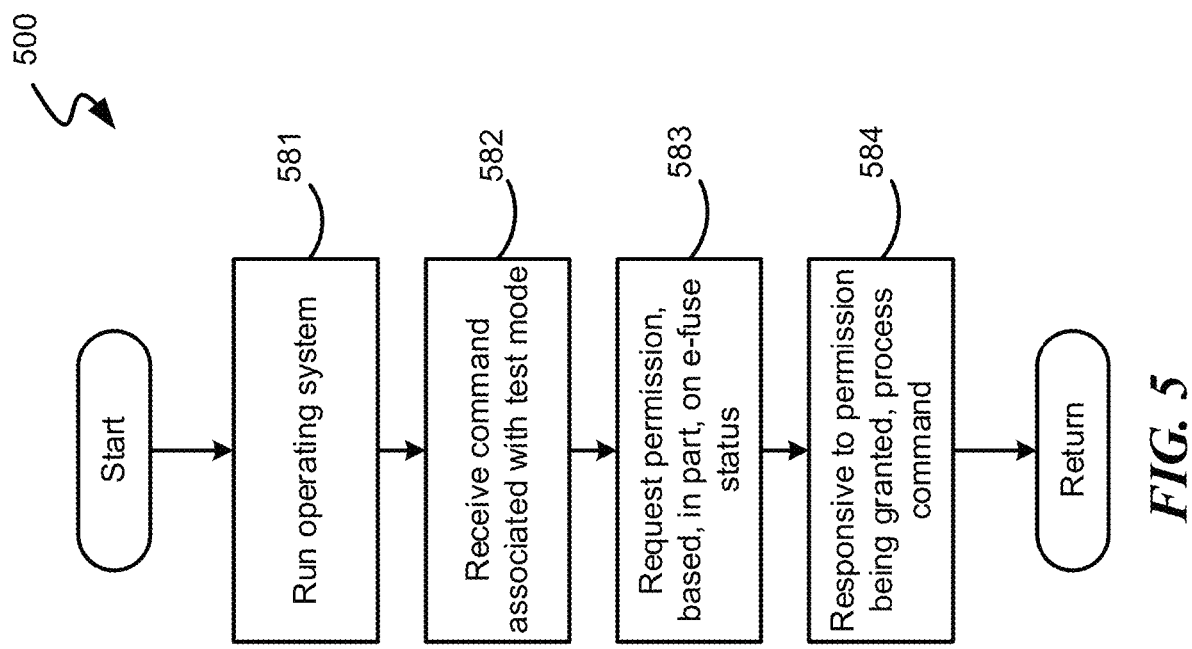
FIG. 5 is a flow diagram illustrating an example process, in accordance with aspects of the present disclosure.

FIG. 5 illustrates an example dataflow for a process (580) for a microcontroller. In some examples, process 580 is performed by a device, such as device 200 of FIG. 2, or device 341 or 341 of FIG. 3, or device 441 of FIG. 4.

In the illustrated example, step 581 occurs first. At step 581, in some examples, an operating system is run on at least one processor of a multi-core controller. As shown, step 582 occurs next in some examples. At step 582, in some examples, a command that is associated with a manufacturer test mode is received by the operating system.

As shown, step 583 occurs next in some examples. At step 583, in some examples, permission associated with the command is requested. In some examples, the permission is based, at least in part, on the status of a one-way e-fuse. As shown, step 584 occurs next in some examples. At step 584, in some examples, responsive to the permission associated with the command being granted, the command is caused to be processed. The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
running an operating system on at least one processor of a multi-core microcontroller;
receiving, at the operating system, a command that is associated with a manufacturer test mode;
requesting a permission associated with the command, wherein the permission is based, at least in part, on the status of a one-way e-fuse, and wherein requesting the permission associated with the command includes communicating a manufacturer test mode query from the operating system to a security subsystem; and responsive to the permission associated with the command being granted, causing the command to be processed.

2. The apparatus of claim 1, the actions further including:
responsive to the manufacturer test mode being done, causing the one-way e-fuse to be blown.

3. The apparatus of claim 1, wherein
if the one-way e-fuse is not blown or a valid manufacturer test mode certificate associated uniquely with the device is presented
the permission associated with the command is granted;
else
the permission is denied.

4. The apparatus of claim 1, wherein the device includes a plurality of integrated circuits, the multi-core microcontroller is included on a first integrated circuit of the plurality of integrated circuits, and wherein requesting the permission associated with the command includes:
communicating a manufacturer test mode query from the operating system to a security subsystem, wherein the security subsystem is on a second integrated circuit of the plurality of integrated circuits, and wherein the second integrated circuit of the plurality of integrated circuits is different from the first integrated circuit of the plurality of integrated circuits; and
communicating a response to the manufacturer test mode query from the security subsystem to the operating system, wherein the response to the manufacturer test mode query indicates whether permission for the manufacturer test mode is granted.

5. The apparatus of claim 1, wherein the device further includes a radio, and wherein the manufacturer test mode enables the radio to operate out of compliance.

6. The apparatus of claim 1, wherein
responsive to the permission associated with the command being granted, the manufacturer test mode is generally enabled.

7. The apparatus of claim 1, wherein
responsive to the permission associated with the command being granted, the manufacturer test mode is enabled for the command.

8. The apparatus of claim 1, the actions further including:
performing a self-check, wherein the self-check includes determining whether the e-fuse has been blown; and
externally reporting results of the self-check.

9. The apparatus of claim 1, the actions further including:
receiving a remote command to blow the e-fuse; and
in response to the remote command, causing the e-fuse to be blown.

10. The apparatus of claim 1, the actions further including:
enforcing reduced functionality for the device while the e-fuse has not been blown.

11. The apparatus of claim 1, wherein the actions further include:
installing a relay on the at least one processor, wherein the relay communicates the command from a testing host to the operating system.

12. The apparatus of claim 11, the actions further including:
responsive to the manufacturer test mode being done:
causing the e-fuse to be blown; and
uninstalling the relay.

13. A method, comprising:
running an operating system on at least one processor of a multi-core microcontroller;
receiving, at the operating system, a request to enter a manufacturer test mode;
querying a security subsystem for permission to enter the manufacturer test mode, wherein querying the security subsystem for permission to enter the manufacturer test mode includes communicating a manufacturer test mode query from the operating system to the security subsystem;
receiving a response to the query from the security subsystem; and
responsive to the response to the query from the security subsystem indicating that permission to enter the manufacturer test mode is granted, entering the manufacturer test mode.

14. The method of claim 13, further comprising:
installing a relay on the at least one processor, wherein the relay communicates the command from a testing host to the operating system.

15. The method of claim 13, wherein
the security subsystem is configured to monitor a one-way e-fuse; and
if the one-way e-fuse is not blown or a valid manufacturer test mode certificate associated uniquely with the device is presented
the permission associated with the command is granted by the security subsystem;
else
the permission is denied by the security subsystem.

16. The method of claim 15, further comprising:
responsive to the manufacturer test mode being done, causing the one-way e-fuse to be blown.

17. A processor-readable storage medium, having stored thereon processor-executable code for computer network design, that, responsive to execution by at least one processor, enables actions, comprising:
receiving, at an operating system, a command that is associated with a manufacturer test mode;
based on a manufacturer test mode query, evaluating permission associated with the command, wherein the permission is based, at least in part, on the status of a one-way e-fuse, such that the permission is granted if the e-fuse is not blown; and
causing the command to be processed responsive to the permission associated with the command being granted.

18. The processor-readable storage medium of claim 17, the actions further comprising:
responsive to the manufacturer test mode being done, causing the one-way e-fuse to be blown.

19. The processor-readable storage medium of claim 17, wherein
if the one-way e-fuse is not blown or a valid manufacturer test mode certificate associated uniquely with the device is presented
the permission associated with the command is granted;
else
the permission is denied.

20. The processor-readable storage medium of claim 17, wherein operating system is running on a processor of a first integrated circuit of a plurality of integrated circuits on a device, and wherein evaluating the permission associated with the command includes:
causing communication of a manufacturer test mode query from the operating system to a security subsystem, wherein the security subsystem is on a second integrated circuit of the plurality of integrated circuits, and wherein the second integrated circuit of the plurality of integrated circuits is different from the first integrated circuit of the plurality of integrated circuits;

receiving, by the operating system, a response to the manufacturer test mode query from the security subsystem to the operating system, wherein the response to the manufacturer test mode query indicates whether permission for the manufacturer test mode is granted; and determining, by the operating system, after the response to the manufacturer test mode query is received, whether the response to the manufacturer test mode query indicates that permission for the manufacturer test mode is granted.

* * * * *